Jan. 6, 1970

E. C. MONTGOMERY 3,488,175

METHOD AND APPARATUS FOR MAKING SHEET GLASS

Filed June 30, 1966

INVENTOR.
Edwin C. Montgomery
BY
Robbe & Swope
ATTORNEYS

United States Patent Office 3,488,175
Patented Jan. 6, 1970

3,488,175
METHOD AND APPARATUS FOR MAKING SHEET GLASS
Eldwin C. Montgomery, Modesto, Calif., assignor to Libbey-Owens-Ford Company, Toledo, Ohio, a corporation of Ohio
Filed June 30, 1966, Ser. No. 561,881
Int. Cl. C03b 29/04
U.S. Cl. 65—65                    2 Claims

ABSTRACT OF THE DISCLOSURE

Producing a continuous sheet of glass of less than equilibrium thickness by vertically drawing a glass sheet of less than equilibrium thickness from a mass of molten glass and depositing it upon a bath of molten metal having a density greater than the glass. The glass is heated on the metal bath to reduce it to a molten state so that it flows laterally toward a layer of stable thickness as it is conveyed thereacross, and the lateral flow is arrested when the glass layer attains the desired thickness.

---

Figure 1:
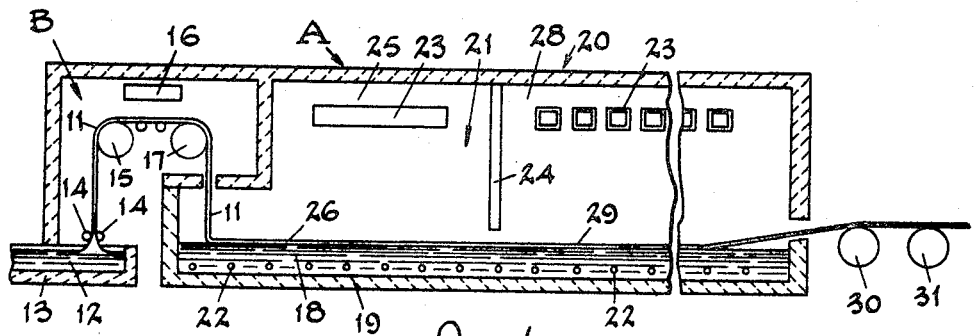

The present invention relates broadly to the production of flat glass by the relatively new, so-called "float" process and more particularly to the production, by the same general procedure, of a relatively thin ribbon of glass, from which thin sheets or plates of high quality and uniform thickness can be cut.

As first successfully practiced, the float process was limited to the production of relatively heavy glass (greater than ¼" thickness) and even at its present stage of development is generally considered to be inherently best adapted to produce glass of a thickness heavier than regular ground and polished plate glass. Indeed it may be said that up to this point the advantages of float glass have been predicated on its being of one specific, stable and relatively heavy thickness.

Thus, as explained in United States Patent 3,083,551, in practicing the conventional float process glass is delivered at a controlled rate onto a bath of molten metal such as tin in a manner to establish a relatively thick buoyant body of molten glass the side edges of which are permitted unhindered lateral flow over the surface of the molten bath so that a layer of stable thickness will develop. Thereafter, this buoyant layer of stable thickness is continuously advanced in ribbon form along the bath and sufficiently cooled as it advances to permit it to be taken unharmed out of the bath.

This procedure is successful because, at elevated temperatures, e.g., 900° C. or over, a buoyant (freely floating) body or layer of molten glass, when supported on a bath of molten metal automatically achieves a condition of equilibrium and therefore of stable thickness, if it is permitted to spread or flow laterally on the bath without constraint; the stable thickness being achieved when the lateral flow ceases, i.e., when equilibrium has been established between the forces of surface tension of the molten glass and the molten metal and the forces of gravity.

In creating this condition of equilibrium in the molten glass any distortion disappears and the buoyant layer which has assumed level formation develops as a ribbon of glass of uniform thickness that is free of distortion and has a fire finish.

This is the very heart of the original float process and is what has given the desirable characteristics to the ultimate float product. However, it is also a seriously limiting factor because it makes the thickness of the ultimate product dependent on the surface tension and density of the glass from which it is made and most flat glasses in the world today are soda-lime-silica glasses. This means that they have substantially the same surface tension and density, i.e., surface tension of approximately 300 dynes/centimeter and density of approximately 2.5 gms./cubic centimeter, so that, when they reach equilibrium in the float process, they all achieve approximately the same stable thickness which has been found to be between approximately 0.280 and 0.295" or well over ¼".

There are, of course, a number of uses for such heavy flat glass. But many thicknesses that are widely used and in great demand commercially are thinner than this, i.e., in the range between approximately ⅛" and ¼". Consequently, it is apparent that, for the float glass process to attain its full commercial potential and to have universal application in the making of flat glass, the basic concept must be modified sufficiently and in a way to make it possible to produce much thinner glass, in a variety of thicknesses that can be accurately predetermined, without sacrificing "float quality."

The need for thinner than equilibrium float glass was evident long prior to this invention and considerable effort has been expended in conceiving and trying various ways of producing it.

For example, United States Patent 3,083,551 suggests that the thickness of the ultimate float ribbon can be modified by increasing the speed of the conveying means that is used outside of the molten bath to take the cooled ribbon therefrom. The idea behind this is to so modify the traction effort as to attenuate or stretch the glass body of stable thickness as it is advanced along the bath.

However such a stretching force, while thinning, also excessively narrows the ribbon and produces surface distortion in the finished sheet. In fact width changes are so marked that edge rolls have been necessary to hold a very wide ribbon in order to obtain a usable width sheet after stretching; and operation of these edge rolls requires additional man power and sets up stretching forces in different directions.

It is therefore a primary object of the present invention to provide a method of producing relatively thin glass of predetermined thicknesses by the float process without stretching or otherwise distorting the glass in the buoyant layer and with a minimum reduction in the potential width of the ultimate glass ribbon.

Briefly stated this and other important objects are accomplished according to the invention by what may be termed a reverse spreading technique in a modified float process. This technique involves (1) establishing a buoyant layer of liquid glass of a thickness appreciably less than equilibrium thickness on the surface of a bath of molten metal; (2) permitting this relatively thin layer to contract by unhindered lateral flow inwardly toward its greater stable or equilibrium thickness as it is advanced in ribbon form along the bath; and (3) arresting the thickening of the glass in the layer or ribbon at a predetermined point intermediate the thickness of the thin established layer and equilibrium thickness.

Consequently another object of the invention is to produce a ribbon of float glass in less than equilibrium thickness while maintaining the forces of surface tension in the buoyant layer of liquid glass equal in all directions whereby to remove distortion and thickness variations.

Further objects and advantages will become apparent during the course of the following description when taken in connection with the accompanying drawings.

Figure 2:
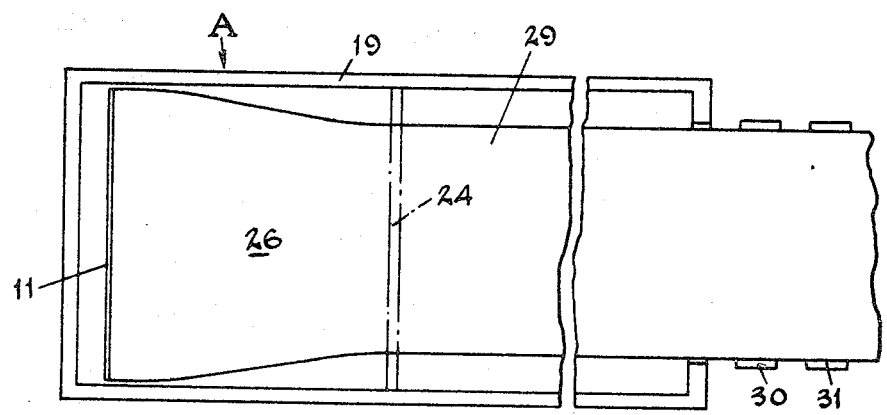

In the drawings, wherein like numerols are employed to designate like parts throughout the same:

FIG. 1 is a schematic, longitudinal, sectional view through one form of apparatus that can be used in practicing the method of the invention; and FIG. 2 is a plan view of the float part of the apparatus of FIG. 1 with the roof structure removed.

Referring now more particularly to the drawings there has been illustrated diagrammatically at A in FIGS. 1 and 2 a float glass apparatus of the general character described in U.S. Patent 3,083,551. As in the patent, glass can be delivered at a controlled rate to the float apparatus A either as a preformed sheet or as a molten stream and, as illustrated in FIG. 1, the glass delivery means is a modified Colburn type window glass machine B.

With this arrangement an extremely thin ribbon or sheet of glass 11 may be drawn from a mass of molten glass 12 in a draw pot 13 upwardly, between width maintainers 14, and into the horizontal plane over a bending roll 15 in a manner that is old and well known. During its horizontal travel the glass sheet 11 can be kept in a plastic condition by heaters 16 so that it can subsequently be bent downwardly out of the horizontal plane and delivered as a preformed sheet onto the surface of a bath of molten metal 18 in the apparatus A.

This bath 18 of molten metal, such as tin, is contained in a tank 19 having a roof portion 20 enclosing a headspace 21 which contains the "float atmosphere" in the form of a protective gas such as nitrogen in sufficient volume to prevent any ingress of air or any chemical reaction with the metal in the exposed part of the bath that might contaminate the glass. The temperature of the bath 18 can be controlled from one end to the other as by thermal regulators 22 immersed therein and that of the headspace 21 by thermal regulators 23 mounted over the bath.

Where the glass is delivered as a performed sheet, it is necessary to heat the sheet to reduce the glass therein to a liquid state in order to establish the thin bouyant layer of glass that will flow laterally inward toward its equilibrium thickness; and to then maintain this temperature until the glass in the bouyant layer has contracted to the extent necessary to arrive at the thickness desired in the finished float ribbon. To this end a tweel 24 is located to separate the headspace 21 into a forward or heating area 25 in which the sheet 11 is transformed into a bouyant body or layer of liquid glass 26 which develops into a layer of the desired thickness as it is advanced in ribbon form along the bath; and a rear or cooling area 28 in which the contraction or lateral flow of the bouyant layer 26 is arrested and the ribbon 29 of the desired thickness is cooled to a point where it can be removed unharmed from the bath.

In operation, when it is desired to produce float glass of approximately $\frac{1}{8}''$ thickness for example from conventional soda-lime-silica glass it is necessary to establish a layer of liquid glass on the molten bath 18 that has a thickness considerably less than the $\frac{1}{8}''$ thickness desired in the finished product; and, with the apparatus of FIGS. 1 and 2, by operating the Colburn type window glass drawing machine at speeds and temperatures ordinarily used in producing picture or micro sheet glass a sheet 11 having a thickness of as little as $\frac{1}{32}''$ can be deposited on the molten bath 18.

By empolying radiant heaters as the temperature regulators 23 in the area 25 the glass in the sheet 11 can be reduced to liquid form and so becomes a bouyant (freely floating) body or layer of glass which, with its temperature maintained and its lateral flow unhindered, will contract into a thicker and thicker layer as its flows laterally inward toward its equilibrium thickness which, for soda-lime-silica glass, is something over $\frac{1}{4}''$.

According to a preferred embodiment of the present invention, as this constantly thickening bouyant layer of liquid glass 26, advancing in ribbon form along the surface of the bath 18, approaches the thickness which it is desired to produce, the temperature of the glass is reduced sufficiently to arrest its lateral flow and set the glass at a predetermined point. This may be, for example, when the ribbon thickness reach $\frac{1}{8}''$ or approximately one half of the equilibrium thickness of soda-lime-silica glass.

The temperature reduction necessary to set the glass at a specified ribbon thickness may be accomplished by reducing the heat output of the radiant heaters in the temperature regulators 23 beyond a particular point in the length of the headspace 21 and/or by the use of coolers as temperature regulators beyond that point.

In this connection, the temperature regulators in the area 25 will ordinarily be operated to produce a temperature in this part of the headspace that is near or above 1000° C. in order to reduce the ribbon 11 to a bouyant layer of liquid glass 26 and to maintain the glass in this layer sufficiently fluid for free lateral flow on the bath 18 until the layer 26 as it is being advanced in ribbon form contracts and thickens to the point that has been decided upon for the ultimate float glass product.

Also, it will be understood that, while the glass in the layer 26 must be maintained at a temperature sufficient to permit it to flow laterally on the molten bath, the contraction of the layer 26 to a ribbon 29 of the desired thickness may be a function of time as well as temperature. For this reason the headspace 21 is preferably so divided by the tweel 24 that, while in the area 25, the layer 26 will have sufficient time at optimum temperatures to develop its desired thickness. Then, as the ribbon passes beneath the tweel 24 into the rear compartment 28 of the headspace, the temperature of the glass will be sufficiently reduced by the operation or composition of the temperature regulators 23 to set it at the instant it reaches its predetermined final thickness; and the ribbon 29 will thereafter be further gradually cooled to a temperature at which it can be removed unharmed from the bath by mechanical means.

As here shown, the means for removing the ribbon 29 from the bath includes a take-out roll 30 by which the ribbon is lifted from the surface of the bath 18 and a series of conveyor and/or lehr rolls 31 over which the ribbon is carried into and through an annealing lehr (not shown). The rolls 31 are preferably driven at a speed to exert just enough tractive force on the ribbon 29 to cause the bouyant layer of glass 26 to advance as it develops into ribbon form and to be removed from the bath as a fully set ribbon by the take-off roll 30.

From the above it will be appreciated that one method of producing an undistorted float glass ribbon of a uniform predetermined thickness less than equilibrium thickness according to this invention, when expressed in its simplest terms, consists in (1) feeding a preformed ribbon of glass that is thinner than the final thickness desired onto the surface of the float bath; (2) then heating the glass in the preformed ribbon to and maintaining it at a temperature at which the surface tension acts to move the ribbon thickness toward equilibrium; and (3) when the ribbon has thickened to the point desired in the finished glass, arresting the thickening process by cooling the ribbon.

There are two distinct advantages in this method of operation one of which is that the forces of surface tension are equal in all directions and operation of this even force will not act to produce distortion. Instead the even forces will tend to remove any distortion or thickness variation that may be present in a preformed ribbon that is fed onto the float bath.

Another advantage over the prior used stretch method of producing thin float glass is that it is possible to obtain a wider finished sheet on a given width of hot end bath. This depends of the thickness change necessary to obtain an even distribution in the ribbon. For example, if a preformed ribbon is fed onto the bath at one half the desired finished thickness the spread width ratio will be 2:1 whereas with the stretch method for 0.125" glass the ratio is 2.45:1 and any decrease in the thickness ratios will give an equivalent decrease in the spread width ratio.

It is to be understood that the forms of the invention herewith described are to be taken as illustrative embodiments only of the same, and that various procedural changes may be resorted to without departing from the spirit of the invention.

I claim:
1. In a method of producing a continuous undistorted glass sheet of a uiform predetermined thickness less than the equilibrium thickness of said glass and having fire-polished surfaces, the improvement comprising maintaining a bath of molten glass at a temperature at which said glass can be drawn into a continuous sheet, drawing glass upwardly from said bath of molten glass under such conditions of speed and temperature as to produce a sheet of glass of less than said equilibrium thickness, depositing the preformed sheet on a bath of molten metal of greater density than said glass to establish a buoyant layer of glass thinner than said predetermined thickness on said molten metal, heating the glass in said layer to reduce it to a viscous state whereat said layer begins contracting laterally toward equilibrium thickness, advancing said layer as a ribbon along said bath, cooling said layer to arrest said contracting when said layer attains said predetermined thickness, and thereafter removing said layer from said bath as a continuous sheet.

2. In apparatus for producing a continuous undistorted glass sheet of a uniform predetermined thickness less than the equilibrium thickness of said glass and having fire-polished surfaces, the improvement comprising a draw pot within which is maintained a supply of molten glass, an elongated tank adjacent said draw pot containing a bath of molten metal, an enclosed headspace over said bath of molten metal, means maintaining an atmosphere of protective gas in said headspace, means for continuously drawing a sheet of glass of less than equilibrium thickness upwardly from said mass of molten glass including a first bending roll about which said upwardly rising sheet is deflected into a substantially horizontal plane, a second bending roll about which the horizontal sheet is deflected downwardly and deposited on said bath of molten metal, a take-out roll at the exit end of said tank for advancing said sheet across said bath of molten metal and removing it therefrom, and thermal regulators within said tank and headspace for first heating the advancing sheet to reduce it to a viscous state whereby it contracts toward equilibrium thickness and then cooling said contracing sheet for removal from said bath on said take-out roll.

References Cited

UNITED STATES PATENTS

| | | | |
|---|---|---|---|
| 3,251,667 | 5/1966 | Touvay | 65—65 X |
| 3,305,338 | 2/1967 | Robinson | 65—99 |
| 3,318,671 | 5/1967 | Brichard et al. | 65—65 |

ARTHUR D. KELLOGG, Primary Examiner

U.S. Cl. X.R.
65—99, 182, 196